US010402093B2

United States Patent
Ben Dayan et al.

(10) Patent No.: US 10,402,093 B2
(45) Date of Patent: *Sep. 3, 2019

(54) CONGESTION MITIGATION IN A MULTI-TIERED DISTRIBUTED STORAGE SYSTEM

(71) Applicant: Weka.IO Ltd., Tel Aviv (IL)

(72) Inventors: Maor Ben Dayan, Tel Aviv (IL); Omri Palmon, Tel Aviv (IL); Liran Zvibel, Tel Aviv (IL); Kanael Arditti, Tel Aviv (IL); Tomer Filiba, Tel Aviv (IL)

(73) Assignee: Weka.IO LTD (IL)

( * ) Notice: Subject to any disclaimer, the term of this patent is extended or adjusted under 35 U.S.C. 154(b) by 143 days.

This patent is subject to a terminal disclaimer.

(21) Appl. No.: 15/485,290

(22) Filed: Apr. 12, 2017

(65) Prior Publication Data

US 2017/0223107 A1 Aug. 3, 2017

Related U.S. Application Data

(63) Continuation of application No. 15/061,518, filed on Mar. 4, 2016, now Pat. No. 9,645,761.

(Continued)

(51) Int. Cl.
```
G06F 3/06        (2006.01)
G06F 16/182      (2019.01)
H04L 12/911      (2013.01)
H04L 29/08       (2006.01)
H04L 12/26       (2006.01)
H04L 12/801      (2013.01)
```
(Continued)

(52) U.S. Cl.
CPC ............ *G06F 3/0607* (2013.01); *G06F 3/061* (2013.01); *G06F 3/0604* (2013.01); *G06F 3/067* (2013.01); *G06F 3/0613* (2013.01); *G06F 3/0619* (2013.01); *G06F 3/0635* (2013.01); *G06F 3/0643* (2013.01); *G06F 3/0647* (2013.01); *G06F 3/0656* (2013.01); *G06F 3/0665* (2013.01); *G06F 3/0673* (2013.01); *G06F 3/0685* (2013.01); *G06F 16/182* (2019.01); *G06F 16/1827* (2019.01); *H04L 43/0882* (2013.01); *H04L 43/16* (2013.01); *H04L 47/12* (2013.01); *H04L 47/6275* (2013.01); *H04L 47/70* (2013.01); *H04L 49/90* (2013.01); *H04L 67/06* (2013.01); *H04L 67/1097* (2013.01); *H04L 67/42* (2013.01)

(58) Field of Classification Search
CPC ...... G06F 12/00; G06F 13/00; G06F 11/1446; G06F 15/06; G06F 3/0647
USPC .......................................... 711/100, 154, 162
See application file for complete search history.

(56) References Cited

U.S. PATENT DOCUMENTS 7,447,839 B2    11/2008  Uppala
7,877,511 B1    1/2011   Berger et al.
(Continued)

*Primary Examiner* — Tuan V Thai
(74) *Attorney, Agent, or Firm* — McAndrews, Held & Malloy, Ltd.

(57) ABSTRACT

A distributed electronic storage system (DESS) comprises congestion management circuitry and data migration circuitry. The congestion management circuitry is operable to determine an amount of congestion in the DESS. The data migration circuitry is operable to control migration of data stored in a first tier of storage to a second tier of storage based on the amount of congestion in the DESS, characteristics of the data, and characteristics of the first tier of storage.

24 Claims, 9 Drawing Sheets

Related U.S. Application Data

(60) Provisional application No. 62/288,106, filed on Jan. 28, 2016.

(51) Int. Cl.
  *H04L 12/865* (2013.01)
  *H04L 12/861* (2013.01)
  *H04L 29/06* (2006.01)

(56) References Cited

U.S. PATENT DOCUMENTS

| | | |
|---|---|---|
| 8,347,011 B2 | 1/2013 | Radovanovic |
| 8,918,478 B2 | 12/2014 | Ozzie et al. |
| 2003/0079019 A1* | 4/2003 | Lolayekar ............ H04L 67/1097 709/226 |
| 2003/0115218 A1 | 6/2003 | Bobbitt et al. |
| 2004/0098415 A1 | 5/2004 | Bone et al. |
| 2004/0205109 A1* | 10/2004 | Hara ................. G06F 17/30082 709/201 |
| 2005/0289152 A1 | 12/2005 | Earl et al. |
| 2013/0103787 A1 | 4/2013 | Glover et al. |
| 2014/0244897 A1 | 8/2014 | Goss et al. |
| 2014/0281280 A1 | 9/2014 | Goss et al. |
| 2015/0106578 A1* | 4/2015 | Warfield ............... G06F 3/0613 711/158 |
| 2015/0210095 A1 | 7/2015 | Anzai |
| 2015/0248366 A1 | 9/2015 | Bergsten et al. |
| 2015/0254088 A1 | 9/2015 | Chou et al. |
| 2015/0355971 A1 | 12/2015 | Becker-Szendy et al. |

* cited by examiner

CONGESTION MITIGATION IN A MULTI-TIERED DISTRIBUTED STORAGE SYSTEM

PRIORITY CLAIM

This patent application is a continuation of U.S. patent application Ser. No. 15/061,518, filed Mar. 4, 2016, which claims priority to U.S. provisional patent application Ser. No. 62/288,106 titled "Congestion Mitigation in a Distributed Storage System" filed on Jan 28, 2016. The above-referenced documents are all hereby incorporated herein by reference in their entirety.

INCORPORATION BY REFERENCE

Each of the following documents is hereby incorporated herein by reference in its entirety:

U.S. patent application Ser. No. 14/789,422 titled "Virtual File System Supporting Multi-Tiered Storage" and filed on Jul. 1, 2015;

U.S. patent application Ser. No. 14/833,053 titled "Distributed Erasure Coded Virtual File System" and filed on Aug. 22, 2015;

U.S. patent application Ser. No. 15/041,123 titled "Congestion Mitigation in a Distributed Storage System" and filed on Feb. 11, 2016;

U.S. patent application Ser. No. 15/041,236 titled "Resource Monitoring in a Distributed Storage System" and filed on Feb. 11, 2016; and U.S. patent application Ser. No. 15/052,525 titled "Management of File System Requests in a Distributed Storage System" and filed on Feb. 24, 2016.

BACKGROUND

Limitations and disadvantages of conventional approaches to data storage will become apparent to one of skill in the art, through comparison of such approaches with some aspects of the present method and system set forth in the remainder of this disclosure with reference to the drawings.

BRIEF SUMMARY

Methods and systems are provided for congestion mitigation in a multi-tiered in a distributed storage system substantially as illustrated by and/or described in connection with at least one of the figures, as set forth more completely in the claims.

DETAILED DESCRIPTION

Figure 1:
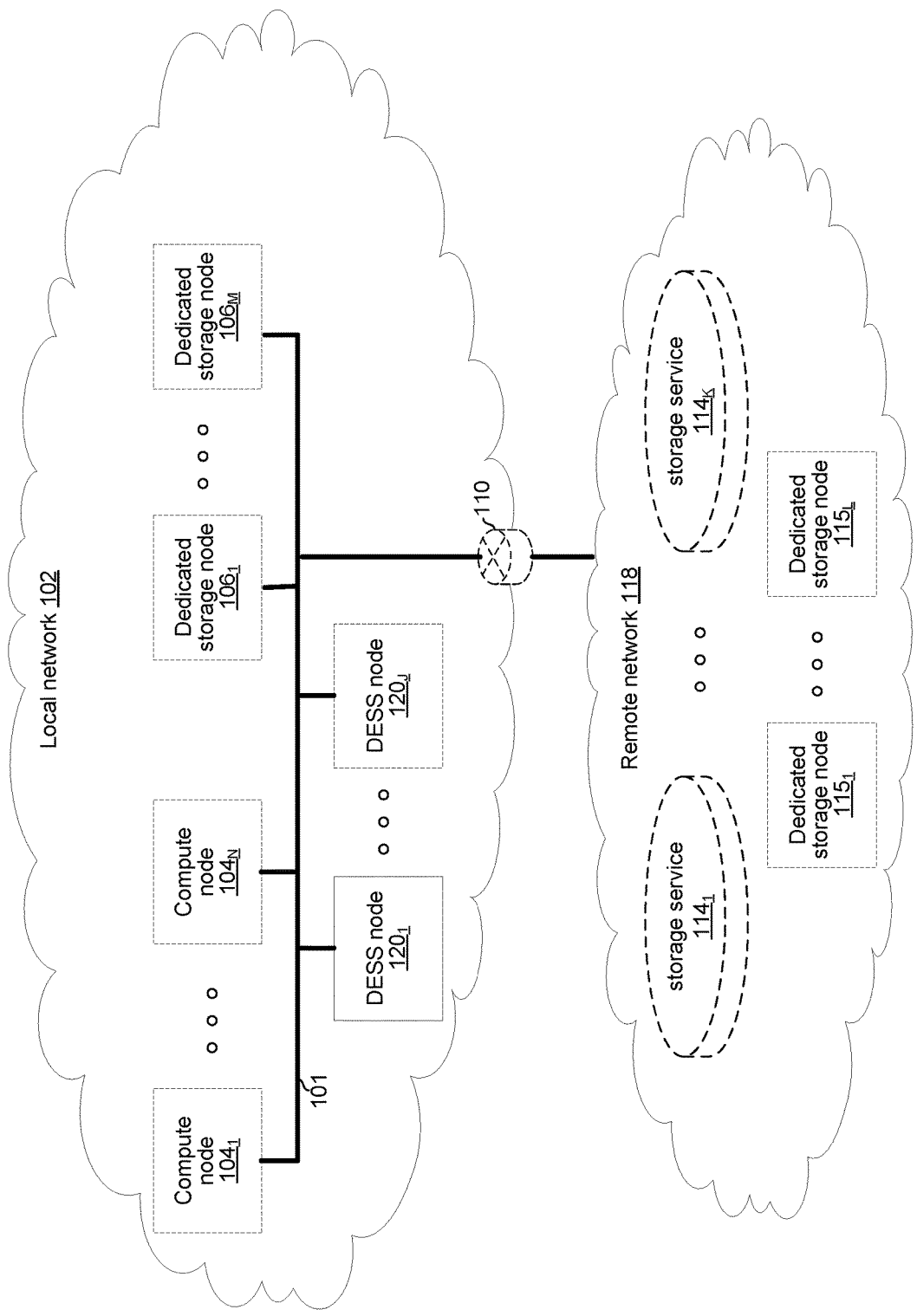
FIG. 1 illustrates various example configurations of a distributed electronic storage system (DESS) in accordance with aspects of this disclosure.

There currently exist many data storage options. One way to classify the myriad storage options is whether they are electronically addressed or (electro)mechanically addressed. Examples of electronically addressed storage options include NAND FLASH, FeRAM, PRAM, MRAM, and memristors. Examples of mechanically addressed storage options include hard disk drives (HDDs), optical drives, and tape drives. Furthermore, there are seemingly countless variations of each of these examples (e.g., SLC and TLC for flash, CDROM and DVD for optical storage, etc.) In any event, the various storage options provide various performance levels at various price points. A tiered storage scheme in which different storage options correspond to different tiers takes advantage of this by storing data to the tier that is determined most appropriate for that data. The various tiers may be classified by any one or more of a variety of factors such as read and/or write latency, IOPS, throughput, endurance, cost per quantum of data stored, data error rate, and/or device failure rate.

Various example implementations of this disclosure are described with reference to, for example, four tiers:

Tier 1—Storage that provides relatively low latency and relatively high endurance (i.e., number of writes before failure). Example memory which may be used for this tier include NAND FLASH, PRAM, and memristors. Tier 1 memory may be either direct attached (DAS) to the same nodes that VFS code runs on, or may be network attached. Direct attachment may be via SAS/SATA, PCI-e, JEDEC DIMM, and/or the like. Network attachment may be Ethernet based, RDMA based, and/or the like. When network attached, the tier 1 memory may, for example, reside in a dedicate storage node. Tier 1 may be byte addressable or block-addressable storage. In an example implementation, data may be stored to Tier 1 storage in "chunks" consisting of one or more "blocks" (e.g., 128 MB chunks comprising 4 kB blocks).

Tier 2—Storage that provides higher latency and/or lower endurance than tier 1. As such, it will typically leverage cheaper memory than tier 1. For example, tier 1may comprise a plurality of first flash ICs and tier 2 may comprise a plurality of second flash ICs, where the first flash ICs provide lower latency and/or higher endurance than the second flash ICs at a correspondingly higher price. Tier 2 may be DAS or network attached, the same as described above with respect to tier 1. Tier 2 may be file-based or block-based storage.

Tier 3—Storage that provides higher latency and/or lower endurance than tier 2. As such, it will typically leverage cheaper memory than tiers 1 and 2. For example, tier 3 may comprise hard disk drives while tiers 1 and 2 comprise flash. Tier 3 may be object-based storage or a file based network attached storage (NAS). Tier 3 storage may be on premises accessed via a local area network, or may be a cloud-based accessed via the internet. On-premises tier 3 storage may, for example, reside in a dedicated object store node (e.g., provided by Scality or Cleversafe or a custom-built Ceph-based system) and/or in a compute node where it shares resources with other software and/or storage. Example cloud-based storage services for tier 3 include Amazon S3, Microsoft Azure, Google Cloud, and Rackspace.

Tier 4—Storage that provides higher latency and/or lower endurance than tier 3. As such, it will typically leverage cheaper memory than tiers 1, 2, and 3. Tier 4 may be object-based storage. Tier 4 may be on-premises accessed via a local network or cloud-based accessed over the Internet. On-premises tier 4 storage may be a very cost-optimized system such as tape drive or optical drive based archiving system. Example cloud-based storage services for tier 4 include Amazon Glacier and Google Nearline.

These four tiers are merely for illustration. Various implementations of this disclosure are compatible with any number and/or types of tiers. Also, as used herein, the phrase "a first tier" is used generically to refer to any tier and does necessarily correspond to Tier 1. Similarly, the phrase "a second tier" is used generically to refer to any tier and does necessarily correspond to Tier 2. That is, reference to "a first tier and a second tier of storage" may refer to Tier N and Tier M, where N and M are integers not equal to each other.

FIG. 1 illustrates various example configurations of a distributed electronic storage system in accordance with aspects of this disclosure. Shown in FIG. 1 is a local area network (LAN) 102 comprising one or more distributed electronic storage system (DESS) nodes 120 (indexed by integers from 1 to J, for j≥1), and optionally comprising (indicated by dashed lines): one or more dedicated storage nodes 106 (indexed by integers from 1 to M, for M≥1), one or more compute nodes 104 (indexed by integers from 1 to N, for N≥1), and/or an edge router 110 that connects the LAN 102 to a remote network 118. The remote network 118 optionally comprises one or more storage services 114 (indexed by integers from 1 to K, for K≥1), and/or one or more dedicated storage nodes 115 (indexed by integers from 1 to L, for L≥1). The nodes of the LAN 102 are communicatively coupled via interconnect 101 (e.g., copper cables, fiber cables, wireless links, switches, bridges, hubs, and/or the like). Thus, the zero or more tiers of storage may reside in the LAN 102 and zero or more tiers of storage may reside in the remote network 118 and the DESS is operable to seamlessly (from the perspective of a client process) manage multiple tiers where some of the tiers are on the local network 102 and some are on the remote network 118, and where different storage devices of the various tiers have different levels of endurance, latency, total input/output operations per second (IOPS), and cost structures.

Each compute node $104_n$ (n an integer, where $1 \leq n \leq N$) is a networked computing device (e.g., a server, personal computer, or the like) that comprises circuitry for running a variety of client processes (either directly on an operating system of the node $104_n$ and/or in one or more virtual machines/containers running on the device $104_n$) and for interfacing with one or more DESS nodes 120. As used in this disclosure, a "client process" is a process that reads data from storage and/or writes data to storage in the course of performing its primary function, but whose primary function is not storage-related (i.e., the process is only concerned that its data is reliably stored and retrievable when needed, and not concerned with where, when, or how the data is stored). Example applications which give rise to such processes include: an email server application, a web server application, office productivity applications, customer relationship management (CRM) applications, and enterprise resource planning (ERP) applications, just to name a few. Example configurations of a compute node $104_n$ are described below with reference to FIG. 2.

Each DESS node $120_j$ (j an integer, where $1 \leq j \leq J$) is a networked computing device (e.g., a server, personal computer, or the like) that comprises circuitry for running DESS processes and, optionally, client processes (either directly on an operating system of the device $104_n$ and/or in one or more virtual machines running in the device $104_n$). As used in this disclosure, a "DESS process" is a process that implements aspects of one or more of: the DESS driver, the DESS front end, the DESS back end, and the DESS memory controller described below in this disclosure (any one or more of which may implement one or more choking processes, as described below). Thus, in an example implementation, resources (e.g., processing and memory resources) of the DESS node $120_j$ may be shared among client processes and DESS processes. The processes of the DESS may be configured to demand relatively small amounts of the resources to minimize the impact on the performance of the client processes. From the perspective of the client process(es), the interface with the DESS may be independent of the particular physical machine(s) on which the DESS process(es) are running. Example configurations of a DESS node $120_j$ are described below with reference to FIG. 3.

Each on-premises dedicated storage node $106_m$ (m an integer, where $1 \leq m \leq M$) is a networked computing device and comprises one or more storage devices and associated circuitry for making the storage device(s) accessible via the LAN 102. An example configuration of a dedicated storage node $106_m$ is described below with reference to FIG. 4.

Each storage service $114_k$ (k an integer, where $1 \leq k \leq K$) may be a cloud-based service such as Amazon S3, Microsoft Azure, Google Cloud, Rackspace, Amazon Glacier, and Google Nearline.

Each remote dedicated storage node $115_l$ (l an integer, where $1 \leq l \leq L$) may be similar to, or the same as, an on-premises dedicated storage node 106. In an example implementation, a remote dedicated storage node $115_l$ may store data in a different format and/or be accessed using different protocols than an on-premises dedicated storage node 106 (e.g., HTTP as opposed to Ethernet-based or RDMA-based protocols).

Figure 2:
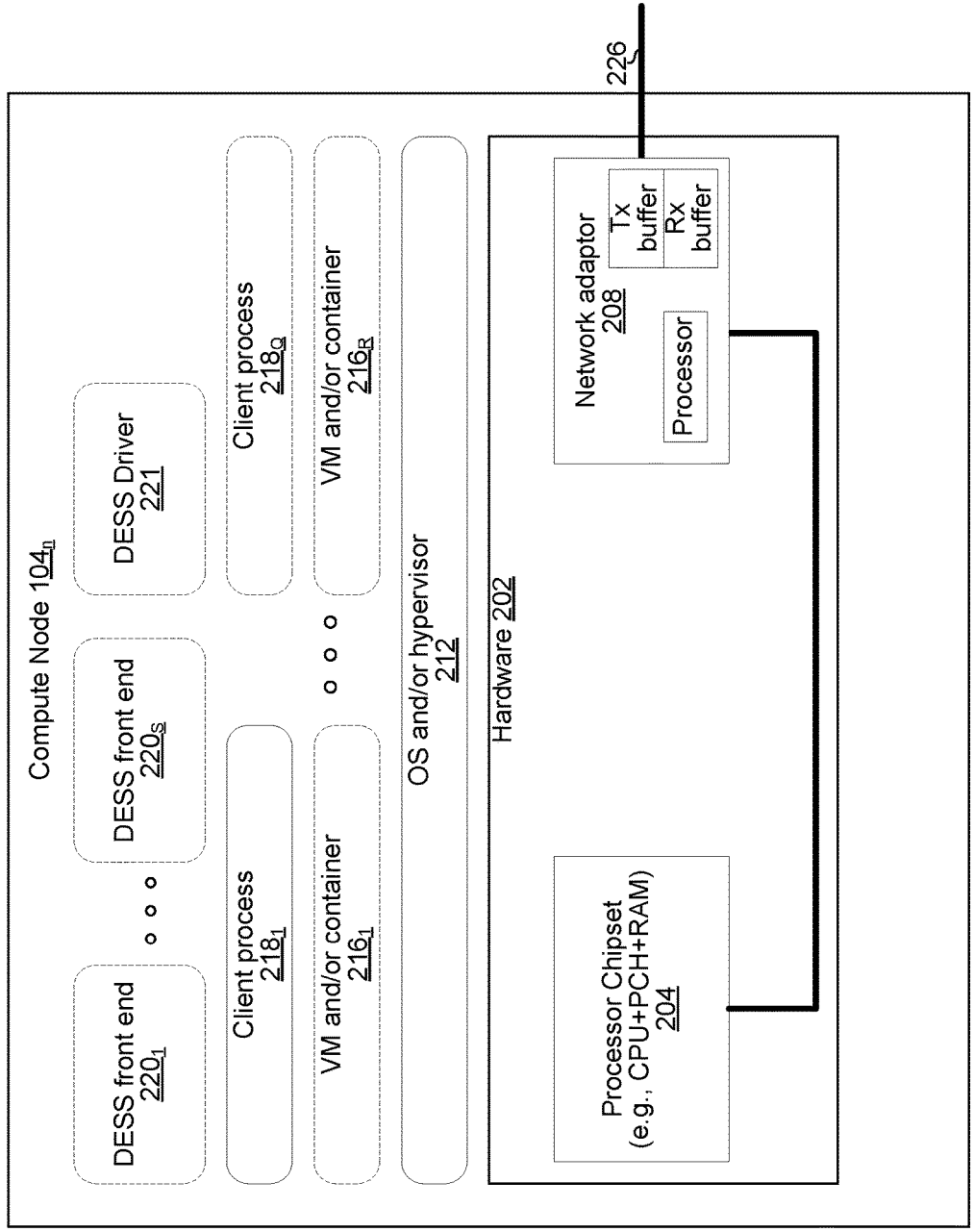
FIG. 2 illustrates various example configurations of a compute node that uses a distributed electronic storage system in accordance with aspects of this disclosure.

FIG. 2 illustrates various example configurations of a compute node that uses a DESS in accordance with aspects of this disclosure. The example compute node $104_n$ comprises hardware 202 that, in turn, comprises a processor chipset 204 and a network adaptor 208.

The processor chipset 204 may comprise, for example, an x86-based chipset comprising a single or multi-core processor system on chip, one or more RAM ICs, and a platform controller hub IC. The chipset 204 may comprise one or more bus adaptors of various types for connecting to other components of hardware 202 (e.g., PCIe, USB, SATA, and/or the like).

The network adaptor 208 may, for example, comprise circuitry for interfacing to an Ethernet-based and/or RDMA-based network. In an example implementation, the network adaptor 208 may comprise a processor (e.g., an ARM-based processor) and one or more of the illustrated software components may run on that processor. The network adaptor 208 interfaces with other members of the LAN 100 via (wired, wireless, or optical) link 226. In an example implementation, the network adaptor 208 may be integrated with the chipset 204.

Software running on the hardware 202 of compute node 104—includes at least: an operating system and/or hypervisor 212, one or more client processes 218 (indexed by integers from 1 to Q, for Q≥1) and one or both of: a DESS driver 221 and DESS front end 220. Additional software that may optionally run on the compute node $104_n$ includes: one or more virtual machines (VMs) and/or containers 216 (indexed by integers from 1 to R, for R≥1).

Each client process $218_q$ (q an integer, where 1≤q≤Q) may run directly on an operating system/hypervisor 212 or may run in a virtual machine and/or container $216_r$ (r an integer, where 1≤r≤R) serviced by the OS and/or hypervisor 212.

The DESS driver 221 is operable to receive/intercept local file system commands (e.g., POSIX commands) and generate corresponding file system requests (e.g., read, write, create, make directory, remove, remove directory, link, etc.) to be transmitted to a DESS front-end (either locally or via the interconnect 101). In some instances, the file system requests transmitted on the interconnect 101 may be of a format customized for use with the DESS front end 220 and/or DESS back end 222 described herein. In some instances, the file system requests transmitted on the interconnect 101 may adhere to a standard such as Network File System (NFS), Server Message Block (DMB), Common Internet File System (CIFS), and/or the like.

Each DESS front end instance $220_s$ (s an integer, where 1≤s≤S if at least one front end instance is present on compute node $104_n$) provides an interface for routing file system requests to an appropriate DESS back end instance (running on a DESS node), where the file system requests may originate from one or more of the client processes 218, one or more of the VMs and/or containers 216, and/or the OS and/or hypervisor 212. Each DESS front end instance $220_s$ may run on a processor of chipset 204 or on a processor of the network adaptor 208. For a multi-core processor of chipset 204, different instances of the DESS front end 220 may run on different processing cores.

Figure 3:
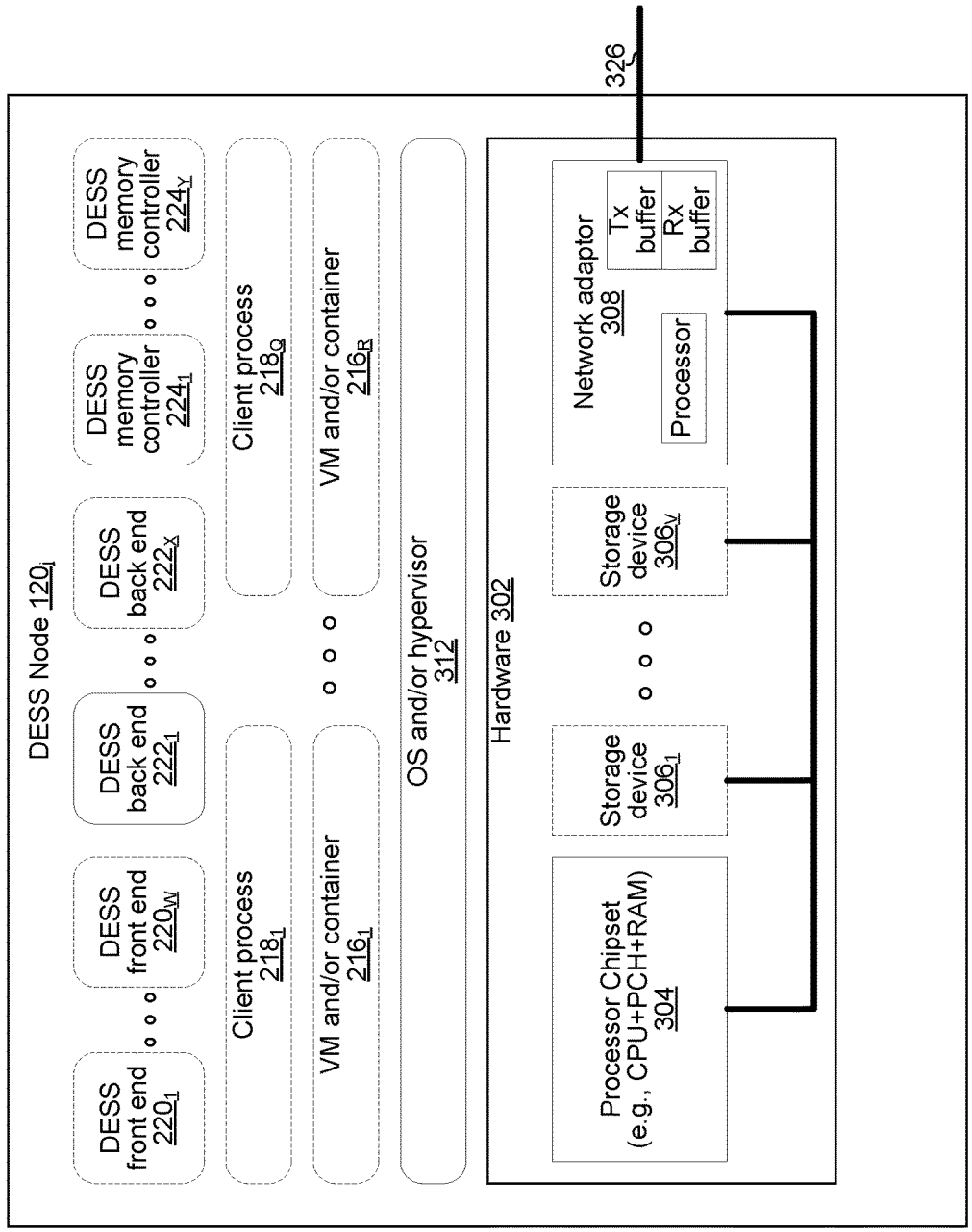
FIG. 3 illustrates various example configurations of a distributed electronic storage system node in accordance with aspects of this disclosure.

FIG. 3 shows various example configurations of a distributed electronic storage system node in accordance with aspects of this disclosure. The example DESS node $120_j$ comprises hardware 302 that, in turn, comprises a processor chipset 304, a network adaptor 308, and, optionally, one or more storage devices 306 (indexed by integers from 1 to W, for W≥1).

Each storage device $306_p$ (p an integer, where 1≤p≤P if at least one storage device is present) may comprise any suitable storage device for realizing a tier of storage that it is desired to realize within the DESS node $120_j$.

The processor chipset 304 may be similar to the chipset 204 described above with reference to FIG. 2. The network adaptor 308 may be similar to the network adaptor 208 described above with reference to FIG. 2 and may interface with other nodes of LAN 100 via link 326.

Software running on the hardware 302 includes at least: an operating system and/or hypervisor 212, and at least one of: one or more instances of DESS front end 220 (indexed by integers from 1 to W, for W≥1), one or more instances of DESS back end 222 (indexed by integers from 1 to X, for X≥1), and one or more instances of DESS memory controller 224 (indexed by integers from 1 to Y, for Y≥1). Additional software that may optionally run on the hardware 302 includes: one or more virtual machines (VMs) and/or containers 216 (indexed by integers from 1 to R, for R≥1), and/or one or more client processes 318 (indexed by integers from 1 to Q, for Q≥1). As mentioned above, DESS processes and client processes may share resources on a DESS node.

The client processes 218 and VM(s) and/or container(s) 216 are as described above with reference to FIG. 2.

Each DESS front end instance $220_w$ (w an integer, where 1≤w≤W, if at least one front end instance is present on DESS node $120_j$) provides an interface for routing file system requests to an appropriate DESS back end instance (running on the same or a different DESS node), where the file system requests may originate from one or more of the client processes 218, one or more of the VMs and/or containers 216, and/or the OS and/or hypervisor 212. Each DESS front end instance $220_w$ may run on the processor of chipset 304 or on the processor of the network adaptor 308. For a multi-core processor of chipset 304, different instances of the DESS front end 220 may run on different processing cores.

Each DESS back end instance $222_x$ (x an integer, where 1≤x≤X, if at least one back end instance is present on DESS node $120_j$) services the file system requests that it receives and carries out tasks to otherwise manage the DESS (e.g., load balancing, journaling, maintaining metadata, caching, moving of data between tiers, removing stale data, correcting corrupted data, etc.) Each DESS back end instance $222_x$ may run on the processor of chipset 304 or on the processor of the network adaptor 308. For a multi-core processor of chipset 304, different instances of the DESS back end 222 may run on different processing cores.

Each DESS memory controller instance $224_u$ (u an integer, where 1≤u≤U, if at least DESS memory controller instance is present on DESS node $120_j$) handles interactions with a respective storage device 306 (which may reside in the DESS node 120j or another DESS node 120 or a storage node 106). This may include, for example, translating addresses, and generating the commands that are issued to the storage device (e.g., on a SATA, PCIe, or other suitable bus). Thus, the DESS memory controller instance $224_u$, operates as an intermediary between a storage device and the various DESS back end instances of the DESS.

Figure 4:
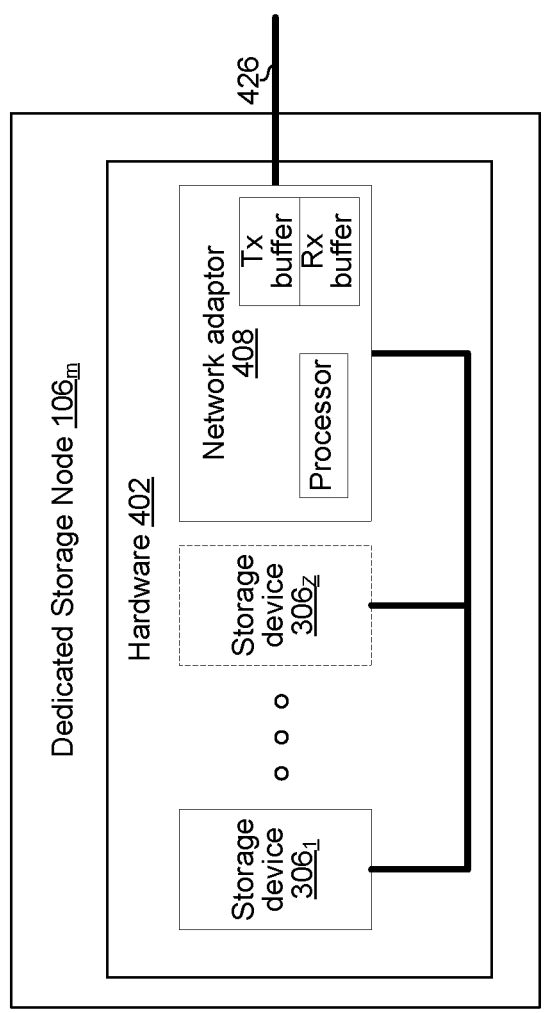
FIG. 4 illustrates various example configurations of a dedicated storage node in accordance with aspects of this disclosure.

FIG. 4 illustrates various example configurations of a dedicated storage node in accordance with aspects of this disclosure. The example dedicated storage node $106_m$ comprises hardware 402 which, in turn, comprises a network adaptor 408 and at least one storage device 306 (indexed by integers from 1 to Z, for Z≥1). Each storage device $306_z$ may be the same as storage device $306_w$ described above with reference to FIG. 3. The network adaptor 408 may comprise circuitry (e.g., an ARM-based processor) and a bus (e.g., SATA, PCIe, or other) adaptor operable to access (read, write, etc.) storage device(s) $406_1$-$406_Z$ in response to commands received over network link 426. The commands may adhere to a standard protocol. For example, the dedicated storage node $106_m$ may support RDMA based protocols (e.g., Infiniband, RoCE, iWARP etc.) and/or protocols which ride on RDMA (e.g., NVMe over fabrics).

In an example implementation, tier 1 memory is distributed across one or more storage devices 306 (e.g., FLASH devices) residing in one or more storage node(s) 106 and/or one or more DESS node(s) 120. Data written to the DESS is initially stored to Tier 1 memory, and then migrated to one or more other tier(s) as dictated by data migration policies, which may be user-defined and/or adaptive based on machine learning.

Figure 5A:
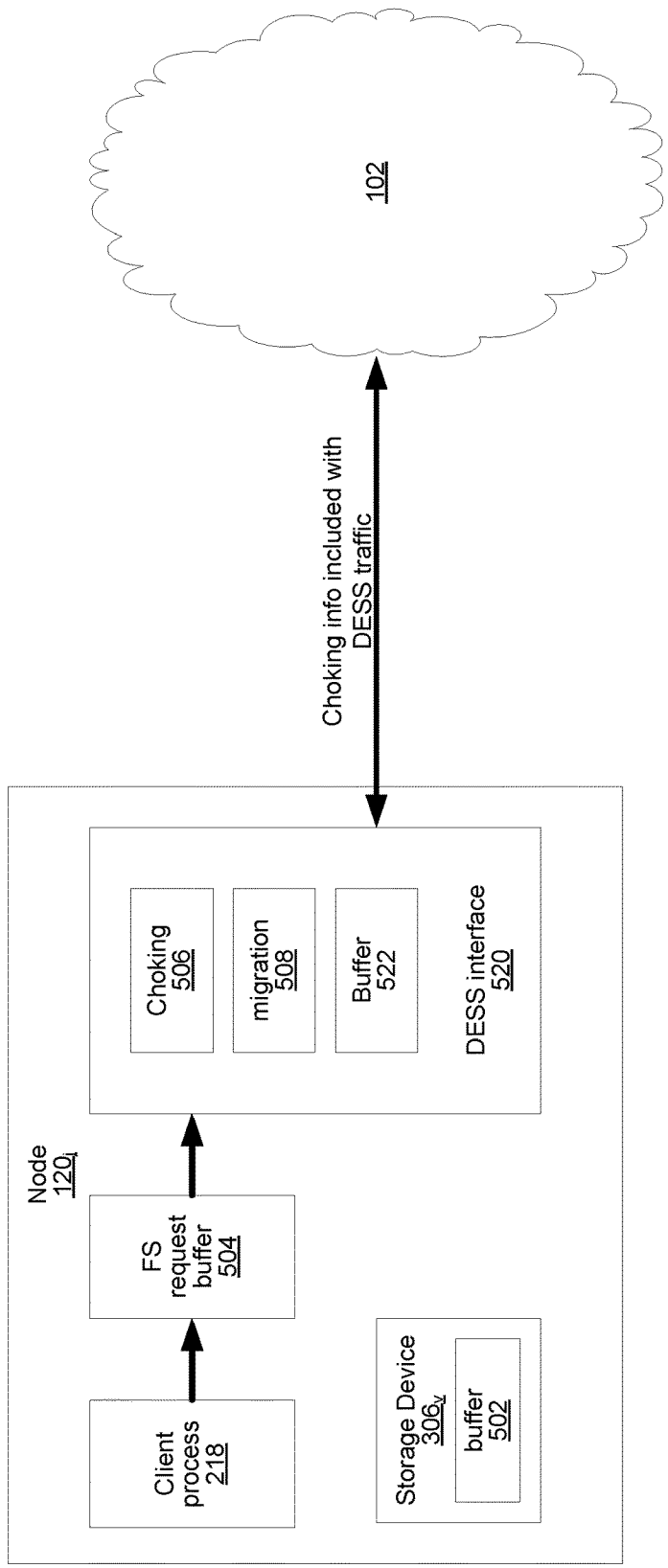
FIG. 5A illustrates an example implementation of a node configured for congestion mitigation in accordance with aspects of this disclosure.

FIG. 5A illustrates a first example implementation of a node configured for congestion mitigation in accordance with aspects of this disclosure. The example DESS node $120_1$ in FIG. 5A comprises circuitry configured to implement a client process 218, a file system request buffer 504, a DESS interface 520, a storage device 306 comprising a buffer 502, one or more file system choking process(es) 506, and one or more migration management process(es) 508.

The client process 218 may be as described above with reference to FIGS. 1-4. The client process 218 submits file system requests to the DESS and those file system requests are buffered in file system request buffer 504.

The file system request buffer 504 may, for example, reside in memory of the chipset 204 (FIG. 2) or 304 (FIG. 3). In the example implementation shown, the node $102_1$ comprises only a single buffer 504. In an example implementation in which the DESS comprises a plurality of distributed file systems which are mounted on the node $120_1$, the node $120_1$ may comprise a plurality of buffers 504—one for each of the mounted file systems.

The DESS interface 520 comprises circuitry configured to implement one or more DESS driver instances 221, DESS front-end instances 220, and/or one or more DESS back-end instances 222, which in turn may perform the choking process(es) 506 and the migration management process(es) 520. The DESS interface 520 may also comprise circuitry to implement one or more buffers 522 for controlling the rate at which DESS messages are transmitted into the network 102. In an example implementation, the buffer(s) 522 are used for DESS messages corresponding to accesses of lower-tier (e.g., tier 3 or lower) storage, but are not used for DESS messages corresponding to accesses of higher-tier storage (i.e., such DESS messages may be sent as soon as they are ready). In another example implementation, the buffer(s) 522 may be used for queuing messages corresponding to accesses of all tiers of storage. In such an implementation, a first one of buffers 522 and/or first choking settings may be used for DESS messages which will access higher-tier storage, and a second one of buffers 522 and/or second choking settings may be used for DESS messages which will access lower-tier storage.

The file system choking process(es) 506 control the rate at which the file system requests in the buffer 504 are fetched by the interface 520 so as to manage congestion in (and, thus, quality of service provided by) the DESS. The file system choking process(es) 506 may also control the rate at which DESS messages are transmitted into the network 102. For example, as part of DESS beck-end operations, the file system choking process(es) 506 may control the rate (e.g., using buffer(s) 522) at which DESS messages are fetched from buffer(s) 522 and transmitted into the network 102.

The migration management process(es) 508 migrate control the migration of data ("data," as used herein with respect to migration, encompasses both data and metadata) from higher-tier storage (e.g., Tier 1 and Tier 2 SSDs organized as file-based or block-based storage) to lower-tier storage (e.g., Tier 3 and/or Tier 4 HDDs organized as object-based storage). The migration management process(es) 508 may run in the background to continually, periodically, and/or occasionally scan the contents of higher-tier (e.g., Tier 1 and Tier 2) storage to identify data that, according to a migration policy in place, should be migrated to lower-tier storage. The migration policy may, for example, take into account characteristics of the data such as: the time of creation of the data, time since last modification of the data, time since last access of the data, size of the data, type of the data (e.g., indicated by file extension), which client process(es) generated and/or have accessed the data, which node(s) of the DESS generated and/or have accessed the data, and/or the like. For data to be migrated, the migration management process(es) 508 may generate file system commands for reading the data from the tier on which it currently resides and writing it to the tier to which it is to be migrated.

The buffer 502 may, for example, comprise RAM within the storage device $306_v$. The buffer 502 is used for buffering data being read from and/or written to nonvolatile storage (e.g., FLASH) of the storage device 306.

In operation, the interface 520 fetches batches of file system requests from the buffer 504, determines which back end instance(s) 222 should service the request(s), generates the appropriate DESS message(s) for conveying the request(s) to the back end(s) 222, and transmits DESS message(s) to the determined back end(s) 222 via the network 102. The rate at which the file system requests are fetched from the buffer 504 is controlled by the choking process(es) 506. In an example implementation, this comprises the choking process(es) 506 determining a choking level and then adjusting one or more settings based on the determined choking level. The one or more settings may comprise, for example: a batch timing setting (i.e., the timing of when file system requests are fetched from the buffer 504), and a batch size setting (i.e., how file system requests are fetched from the buffer 504 at a time). The batch timing setting may, for example, be an interval duration and/or an offset relative to some reference time.

The back end(s) 222 (possibly including a back end instance 222 of the DESS interface 520 of Node $120_1$) receive the DESS message(s) and perform the necessary operations to carry out the file system request. Carrying out the file system request typically involves reading and/or writing data and/or metadata from/to one or more storage device(s) 306. This may, in turn, require the back end instance to generate and transmit DESS messages into the network 102. In an example implementation, such DESS messages may be queued in buffer(s) 522, and then fetched from buffer(s) 522 in accordance with applicable congestion settings. Such congestion settings may be the same as or different from the congestion settings used for controlling the rate at which client file system requests are fetched from buffer(s) 504.

The control of the rate at which file system requests are fetched from buffer(s) 504 and/or the rate at which DESS messages are fetched from buffer(s) 522 may be based on information about the state of the DESS. The state information may be based on the load on (i.e., level of usage of) resources of the DESS. The load may be a most-recently measured/recorded load or may be a predicted load based on historical measurement/recordings (for the same DESS and/or other DESSs) being input to a prediction algorithm. Such resources may include resources of the node $120_1$ (DESS resources "local" to node $120_1$). Such resources may also include similar resources of other nodes 104, $120_j$, and/or 106 of the DESS (DESS resources that are "remote" from the perspective of node $120_1$). Information about the loads on remote resources may be determined from DESS messages received from other nodes of the DESS. Similarly, the node $120_1$ may transmit DESS messages which indicate the loads on its resources. Such DESS messages may contain a direct representation of load on one or more resources and/or may contain values calculated based on the load no one or more resources. This bidirectional exchange of choking information gives choking processes 506 throughout the DESS a more holistic view of the state of the DESS, which enables them to more optimally control the rate at which they submit file system requests to the DESS as compared to if they had to control the rate based only on their respective local resource loads.

Resources for which resource load may be monitored include one or more of the following: storage device, CPU, network, and memory. A load on a storage device may, for example, be represented by a single value determined from depth of buffer 502, or represented by two values where the first is determined from depth of read buffer 710 and the second is determined from depth of write buffer 712. A load on a CPU may, for example, be represented by a value corresponding to a running average of percentage of available cycles per second being used. A load on a network adaptor or link may, for example, be represented by a single value determined from depth of transmit and/or receive buffers, or represented by two values where the first is determined from depth of a transmit buffer and the second is determined from depth of a receive buffer. A load on a memory may, for example, be represented by a single value determined from the amount of used (or free) memory.

Details of example operation of the implementation of FIG. 5A will now be described with reference to the flowchart of FIG. 5B.

Figure 5B:
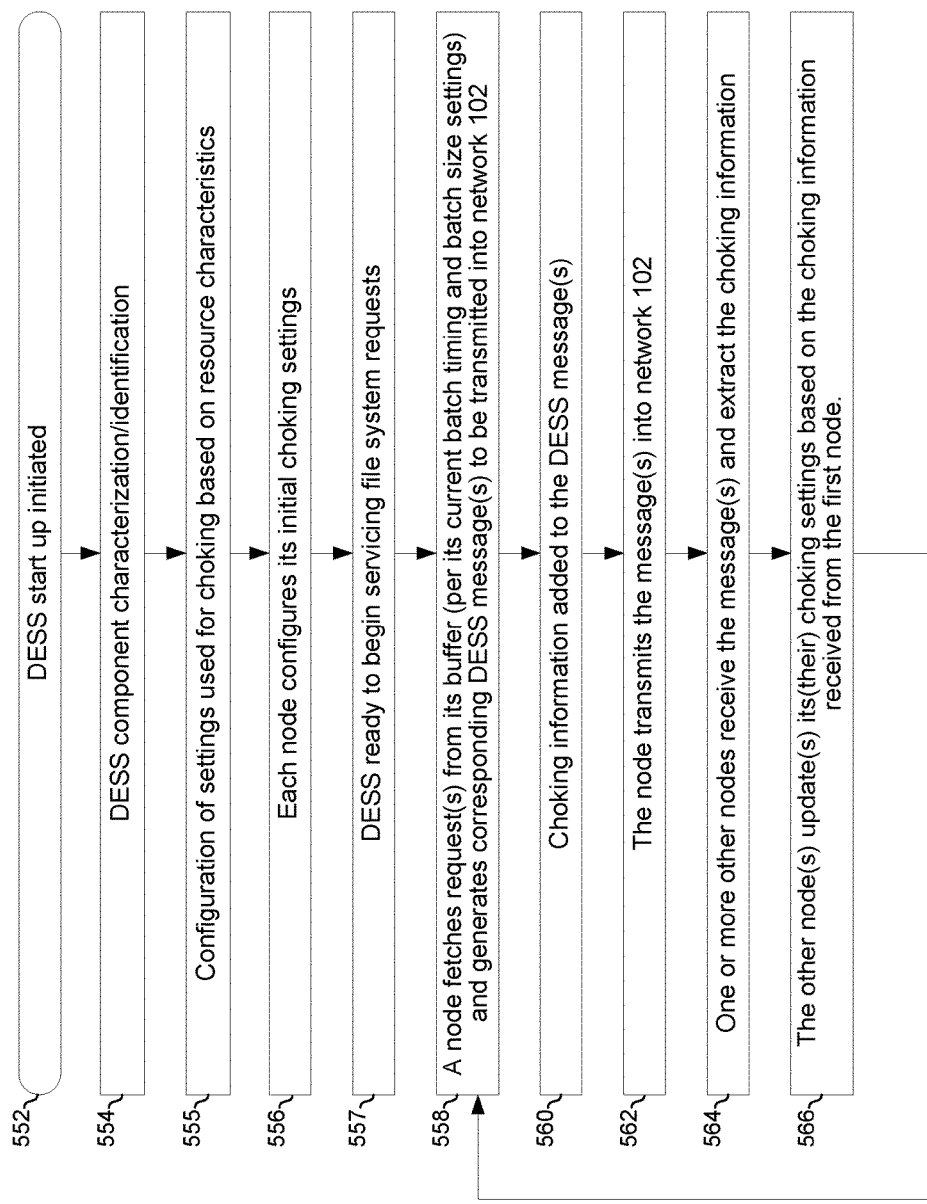
FIG. 5B is a flowchart illustrating an example process for congestion mitigation performed by the node of FIG. 5A.

The process of FIG. 5B begins with block 552 in which the DESS begins its startup/initialization process (e.g., after power up or reset of the node(s) across which it is distributed).

In block 554, various resources (e.g., CPU(s), memory, network adaptor(s), and storage device(s)) of the DESS are characterized. For example, a choking process 506 on each node of the DESS may determine (e.g., through one or more commands supported by the node's operating system) the identity (e.g., manufacturer, model number, serial number, and/or the like) of local resources, and use those identities to retrieve corresponding characteristics from a resource characteristics database (e.g., stored locally in the network 102 and/or accessible via the Internet). For a resource such as a CPU, such characteristics may include, for example, clock speed, cache size, cache speed, number of cores, and/or the like. For a resource such as memory, such characteristics may include, for example, size of memory, speed of memory, and/or the like. For a network adaptor such characteristics may include, for example, latency, maximum throughput, buffer size, and/or the like. For a resource such as a storage device such characteristics may include, for example, size of its buffer 502, write speed (e.g., in input/output operations per second (IOPS)) as a function of the depth (i.e., fill level) of its buffer 502, read speed as a function of the depth of its buffer 502, and/or the like. In instances that a record is not found in the database for an identified resource, a choking process 506 may perform a characterization of the resource before proceeding to block 556. As an example, test reads and/or writes may be issued to a storage device 306 and the resulting read and/or write speed as a function of the depth of its buffer 502 may be monitored and then used to generate a characterization which is then stored to the database.

In block 555, one or more settings used by the choking process(es) 506 are configured based on the resource characteristics determined in block 554. As an example, one or more functions may be used for mapping resource load values to congestion contribution values, mapping congestion contribution values to a choking level, and mapping a choking level to values for a batch timing setting and a batch size setting. Such function(s) may have one or more parameters which may be set based on the characteristics determined in block 554.

In block 556, each node of the DESS determines its initial choking settings (e.g., initial batch timing and batch size settings). The initial choking settings may, for example, be set empirically by a DESS administrator and/or may be set automatically by the choking process 506 based on historical settings used in this DESS and/or other DESSs (e.g., as adapted by a learning algorithm).

In block 557, the DESS is ready to begin servicing file system requests.

In block 558, a DESS interface 520 of a DESS node 120$_j$ (Note: the node 120$_j$ may be a different node on different iterations through the loop comprising blocks 558-566) fetches file system request(s) from its buffer 504 based on its choking settings (e.g., values of batch timing and batch size), and generates one or more corresponding DESS message(s) (e.g., message(s) to convey the file system requests to the appropriate back end(s) 222).

In block 560, a choking process 506 of the node 120$_j$ inserts choking information into the DESS message(s).

In block 562, the node 120$_j$ transmits the DESS message(s) into the network 102.

In block 564, other node(s) of the DESS receive the DESS message(s) and extract(s) the choking information.

In block 566, the other node(s) update their choking settings based on the choking information from node 120$_j$ and based on their most-recent load information for other resources.

Figure 6:
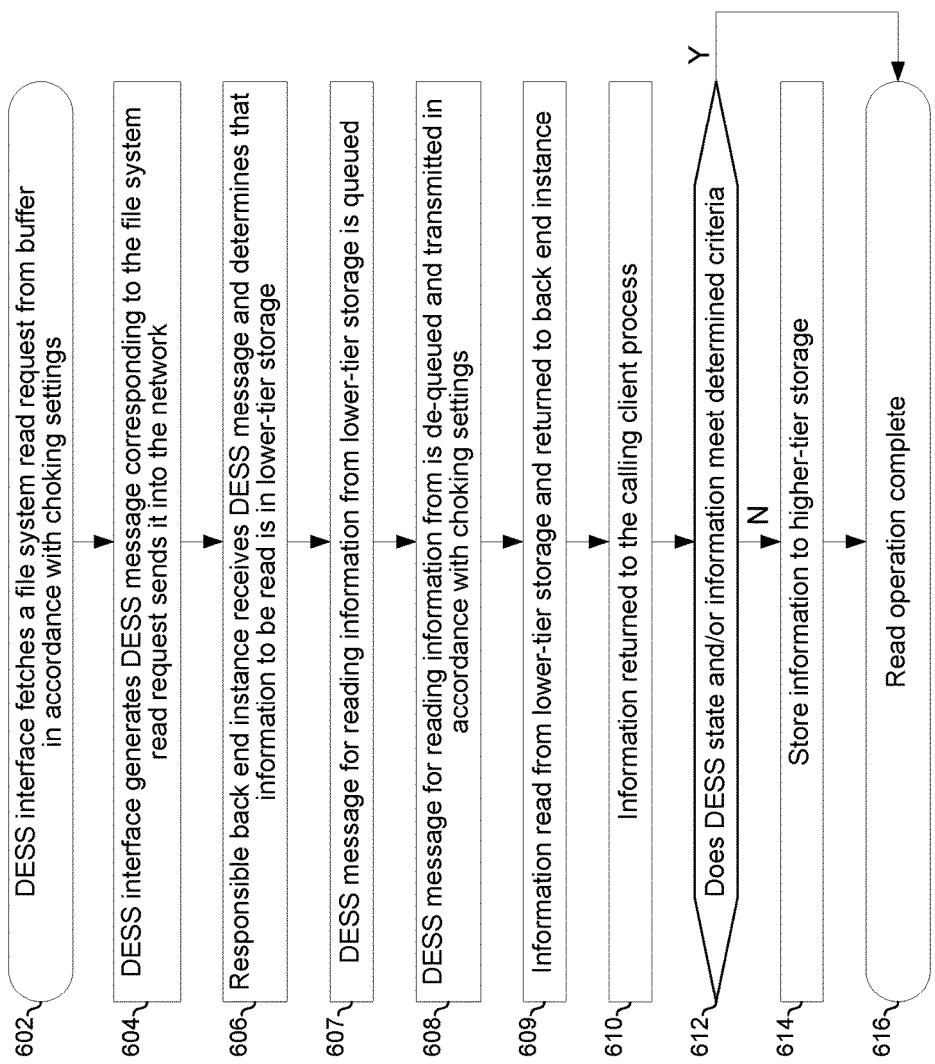
FIG. 6 is a flowchart illustrating managing of reads of information from lower tier storage of a DESS.

FIG. 6 is a flowchart illustrating managing reads of information from lower tier storage of a DESS in accordance with aspects of this disclosure. The process begins with block 602 in which DESS interface 520 fetches a client file system read request from buffer 504 in accordance with choking settings establish such as, for example, described above with reference to FIG. 5B. After block 602, the process advances to block 604.

In block 604, the DESS interface 520 generates a DESS file system read request corresponding to the client file system read request fetched in block 602. The DESS interface 520 encapsulates the DESS file system request in a DESS message and sends the message into the network 102 destined for a back end instance that will service the DESS file system request. After block 604, the process advances to block 606.

In block 606, the back end instance responsible for servicing the DESS file system request sent in block 604 receives the DESS message and determines that information to be read is not currently stored in higher-tier storage (e.g., Tier 1 or Tier 2) and is currently stored only in lower-tier storage (e.g., in a Tier 3 object-based storage). After block 606, the process advances to block 607.

In block 607, the back end instance generates an appropriate DESS message for retrieving the information from the lower-tier storage and queues the message in its buffer 520. After block 607, the process advances to block 608.

In block 608, the DESS message queued in block 607 is fetched from the buffer 520, in accordance with applicable choking settings, and transmitted into the network 102 (possibly destined for remote network 118). After block 608, the process advances to block 609.

In block 609, the information is returned from the lower-tier storage to the back end instance. After block 608, the process advances to block 610.

In block 610, the back end instance returns the read information to the DESS interface 520 from which it received the DESS file system request. The DESS interface 520, in turn, returns the information to the client process that generated the client file system request. After block 610 (or in parallel with block 610), the process advances to block 612.

In block 612, if the state of the DESS and/or characteristics of the read information do(es) not meet determined criterion/criteria, then the process advances to block 614. Otherwise the process advances to block 616. As an example, a criterion for the state of the DESS may be that a load on a resource of the DESS is above a determined threshold. As another example, a criterion for the state of the DESS may comprise a choking level in the DESS being above a determined threshold. As an example, a criterion for the characteristics may comprise a likelihood of the data being read again within a determined time interval. The likelihood may, for example, be determined based on: statistics regarding past read requests from the particular client process and/or similar client processes, statistics regarding past read requests from the particular node on which the client process resides and/or similar nodes, statistics regarding past read requests for the same information and/or similar information (e.g., similar in size, file type, permissions, and/or other characteristics).

In block 614, the information read from the lower-tier storage is stored to higher-tier storage of the DESS as read cache.

In block 616, the read operation is complete.

Figure 7:
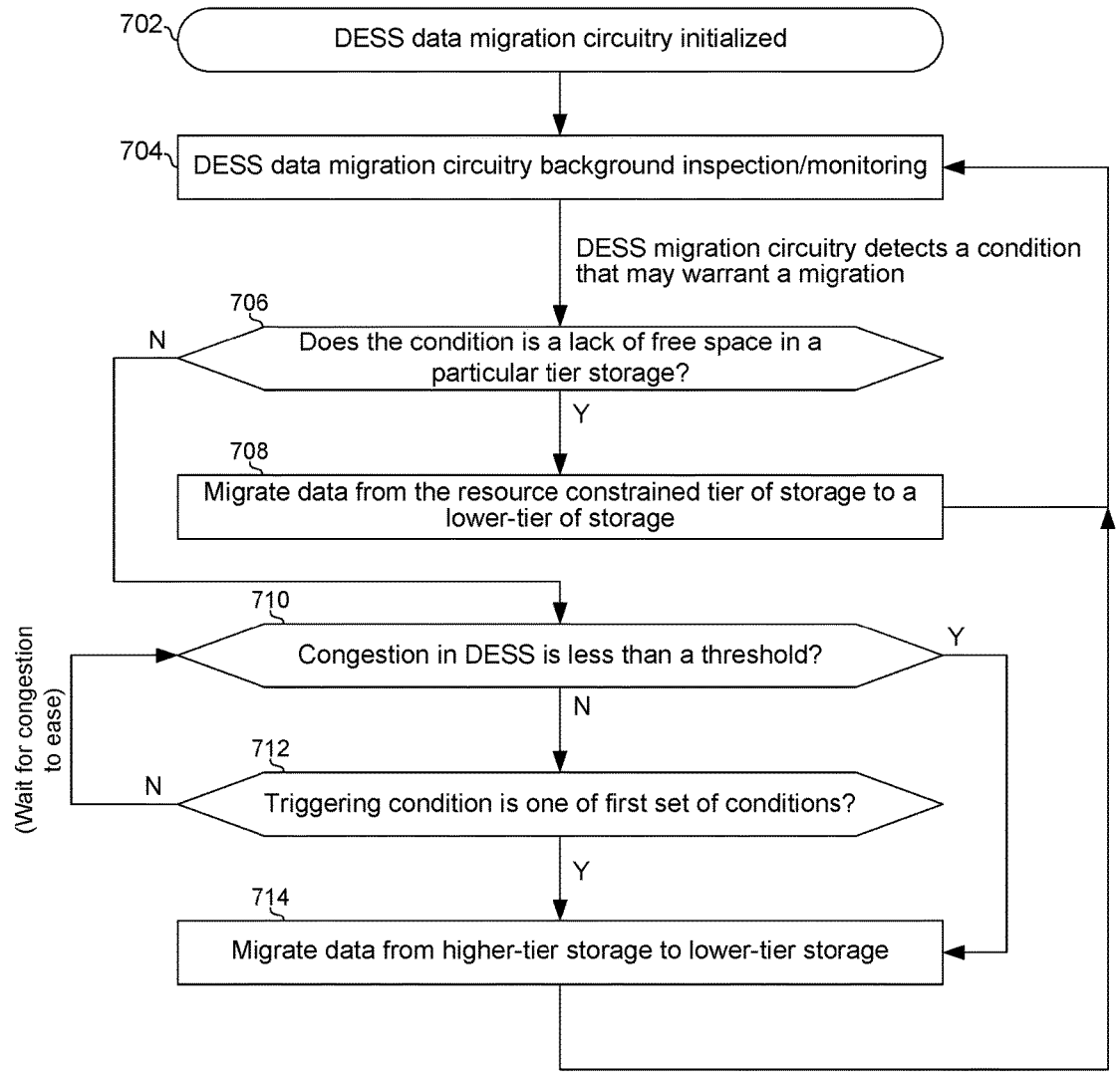
FIG. 7 is a flowchart illustrating managing migration of data from hither-tier storage of a DESS to lower-tier storage of a DESS.

FIG. 7 is a flowchart illustrating managing migration of data to lower tier storage in accordance with aspects of this disclosure. The process begins with block 702 in which DESS data migration circuitry 508 is initialized. After block 702, the process advances to block 704.

In block 704, the DESS data migration circuitry is running in the background and continually, periodically, and/or occasionally inspecting/monitoring the contents of one or more tiers of storage of the DESS. While in block 704, advancement to block 706 is triggered when the DESS migration circuitry detects a condition that may warrant a migration. Such a condition may comprise, for example, detection of data having particular characteristics (e.g., one or more of the characteristics described above with reference to FIG. 5B), and/or a tier of storage having particular characteristics (e.g., being of a first type (e.g., SSD as opposed to HDD), having an amount of unused space below a threshold, and/or the like).

In block 706, if the detected condition is a lack of free space in a particular tier (e.g., tier 1 or tier 2) of storage (e.g., amount of unused data blocks being below a determined threshold), then the process advances to block 708.

In block 708, data is migrated from the particular tier of storage having an insufficient amount of free space to a lower tier of storage. Which data is migrated may, for example, be determined based on characteristics of the data, such as the characteristics described above with reference to FIG. 5B. This migration may take place regardless of the state of the DESS. For example, the migration may be performed even if congestion in the DESS is above a threshold which would otherwise cause migrations triggered by other conditions to be delayed as described below with reference to blocks 710-714. Although Migrations to free up space may contribute to congestion in the short term (e.g., during the initial reads and writes of data being migrated), the migrations may reduce congestion in the medium and long term (i.e., the lack of space may be contributing to the congestion). Furthermore, the priority of the migration relative to other file system operations may be adjusted based on characteristics of the pending file system operations, characteristics of the data to be migrated, the amount of congestion in the DESS, amount of free space in higher-tier(s) of storage, and/or the like. After block 708, the process returns to block 704.

Returning to block 706, if the detected condition is not a lack of free space in a particular tier of storage, then the process advances to block 710.

In block 710, if congestion in the DESS (e.g., represented by load on one or more DESS resources, by choking level(s) calculated in one or more modes, and/or other metric(s)) is below a first determined threshold (e.g., set by a learning algorithm based on analysis of current and past condition of the DESS), then the process advances to block 714.

In block 714, data is migrated from a higher tier of storage of the DESS to a lower tier of storage of the DESS. That is, the data is read from the higher tier and written to the lower tier. The space formerly allocated to the data in the higher tier is freed for storing other data. After block 712, the process returns to block 704.

Returning to 710, if congestion in the DESS is above the first threshold, then the process advances to block 712.

In block 712, it is determined whether the migration triggering condition (i.e., the condition that triggered the progression from block 704 to 706), is one of a predetermined subset of triggering conditions for which migrations are to be performed even when congestion is above the first threshold. If so, the process advances to block 714. If not, then the process returns to block 710. In this manner, the migration is delayed until congestion in the DESS subsides below the first threshold. In this manner, the amount of resources allocated for data migrations can be scaled based on the amount of congestion in the DESS. Although only a single congestion threshold is illustrated, in practice any number of congestion thresholds can be used for any number of different migration triggering conditions.

Figure 8:
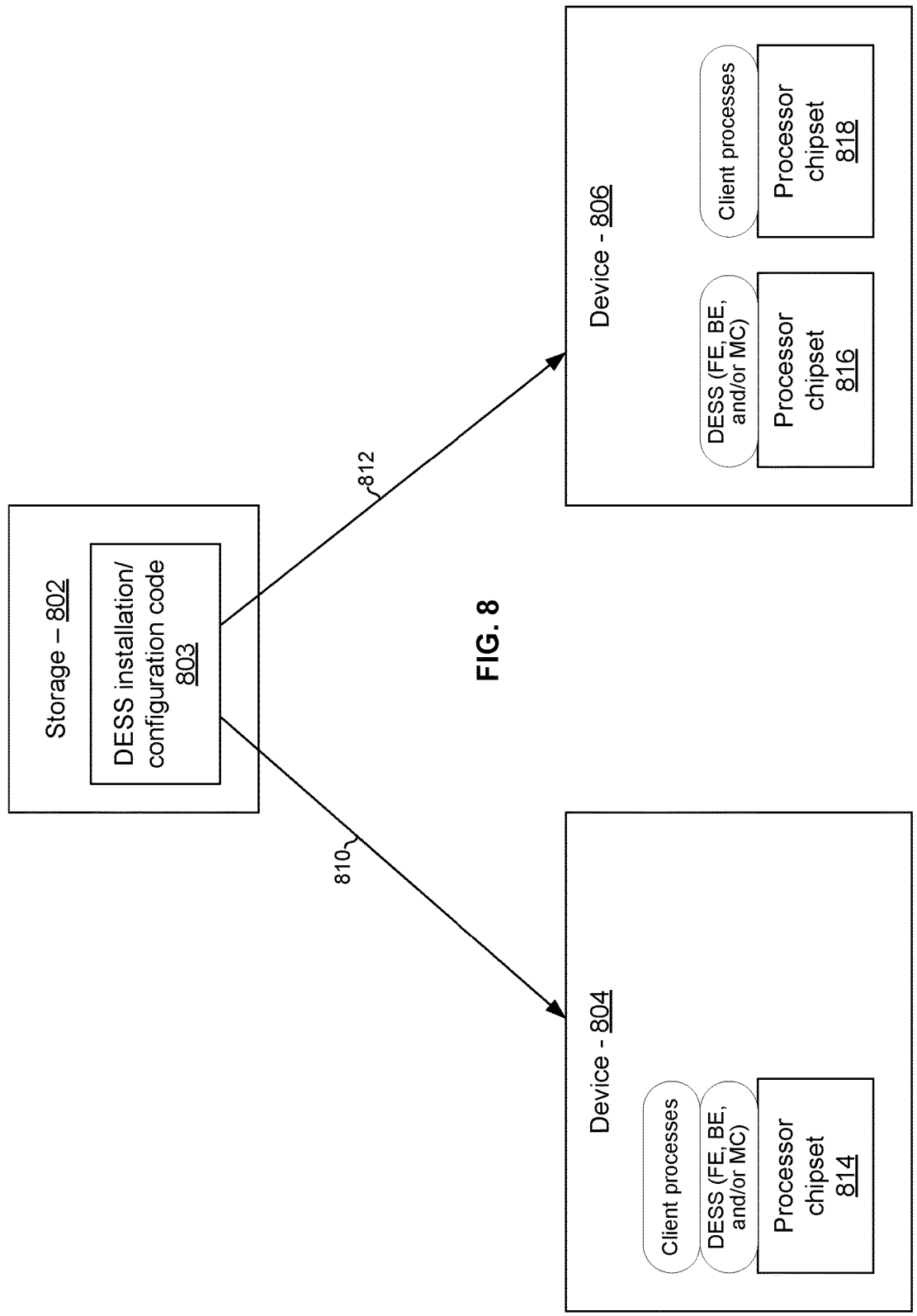
FIG. 8 is a block diagram illustrating configuration of a DESS from a non-transitory machine-readable storage media.

FIG. 8 is a block diagram illustrating configuration of a DESS from a non-transitory machine-readable storage media. Shown in FIG. 8 is non-transitory storage 802 on which resides code 803. The code is made available to computing devices 804 and 806 (which may be compute nodes, DESS nodes, and/or dedicated storage nodes such as those discussed above) as indicated by arrows 810 and 812. For example, storage 802 may comprise one or more electronically addressed and/or mechanically addressed storage devices residing on one or more servers accessible via the Internet and the code 803 may be downloaded to the devices 1004 and 1006. As another example, storage 802 may be an optical disk or FLASH-based disk which can be connected to the computing devices 804 and 806 (e.g., via USB, SATA, PCIe, and/or the like).

When executed by a computing device such as 804 and 806, the code 803 may install and/or initialize one or more of the DESS driver, DESS front-end, DESS back-end, DESS memory controller on the computing device. This may comprise copying some or all of the code 803 into local storage and/or memory of the computing device(s) 804 and/or 806 and beginning to execute the code 803 (launching one or more DESS processes) by one or more processors of the computing device(s) 804 and/or 806. Which of code corresponding to the DESS driver, code corresponding to the DESS front-end, code corresponding to the DESS back-end, and/or code corresponding to the DESS memory controller is copied to local storage and/or memory of the computing device(s) 804 and/or 806 and is executed by the computing device(s) 804 and/or 806 may be configured by a user during execution of the code 803 and/or by selecting which portion(s) of the code 803 to copy and/or launch. In the example shown, execution of the code 803 by the device 804 has resulted in one or more client processes and one or more DESS processes being launched on the processor chipset 814. That is, resources (processor cycles, memory, etc.) of the processor chipset 814 are shared among the client processes and the DESS processes. On the other hand, execution of the code 803 by the device 806 has resulted in one or more DESS processes launching on the processor chipset 816 and one or more client processes launching on the processor chipset 818. In this manner, the client processes do not have to share resources of the processor chipset 816 with the DESS process(es). The processor chipset 818 may comprise, for example, a process of a network adaptor of the device 806.

In accordance with an example implementation of this disclosure, a DESS comprises congestion management circuitry (e.g., circuitry of DESS interface 520 implementing the choking process(es) 506) and data migration circuitry (e.g., circuitry of DESS interface 520 implementing the migration management process(es) 508). The congestion management circuitry is operable to determine an amount of congestion in the DESS. The data migration circuitry is operable to control migration of data stored in a first tier of storage (e.g., storage in one or more devices 306 of the LAN 102) to a second tier of storage (e.g., one or more storage devices 306 of the remote network 118) based on the amount of congestion in the DESS, characteristics of the data, and characteristics of the first tier of storage. As part of the control of the migration, the data migration circuitry may be operable to trigger the migration upon concurrent occurrence of: the amount of congestion in the DESS being less than a determined threshold; and the data having a first particular characteristic. The particular characteristic of the data may be one of: amount of time since creation of the data being greater than a determined threshold; amount of time since last modification of the data being greater than a determined threshold; amount of time since last access of the data being greater than a determined threshold; the data being of a particular size; the data being of a particular type (e.g., indicated by file extension); the data having been generated by a particular client process (e.g., indicated by file extension and/or metadata); and the data having been generated by a particular node of the DESS (e.g., indicated by metadata). As part of the determination of the amount of congestion in the DESS comprises, the congestion management circuitry may be operable to: determine a load on a local resource of the DESS (e.g., load no storage device $306_v$ in FIG. 5B); and determine a load on a remote resource of the DESS (e.g., resource remote from node $120_j$ in FIG. 5b) based on an indication of the load on the remote resource of the DESS received via a network link (e.g., 101). The characteristics of the first tier of storage may comprise an amount of unused space (e.g., measured in bytes) in the first tier of storage. As part of the control of the migration, the data migration circuitry may be operable to: when the amount of unused space in the first tier of storage is below a first threshold, trigger the migration regardless of the amount of congestion of the DESS; and when the amount of unused space in the first tier of storage is above the first threshold, delay the migration until the amount of congestion in the DESS is below the first threshold. The data migration circuitry may be operable to determine whether to store data read from the second tier of storage in the first tier of storage based on the amount of congestion in the DESS. The data migration circuitry may be configured to store the data read from the second tier of storage to the first tier of storage only when the amount congestion in the DESS is below a determined threshold.

Thus, the present methods and systems may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Other typical implementations comprise an application specific integrated circuit (e.g., either on a chip or as a printed circuit assembly). Some implementations may comprise a non-transitory machine-readable storage medium (e.g., FLASH drive(s), optical disk(s), magnetic storage disk(s), and/or the like) having stored thereon one or more lines of code executable by a computing device, thereby configuring the machine to be configured to implement one or more aspects of the methods and systems described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise first "circuitry" when executing a first one or more lines of code and may comprise second "circuitry" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

What is claimed is:

1. A method comprising:
 determining, by congestion management circuitry of a distributed electronic storage system (DESS), an amount of congestion in the DESS;
 controlling, by data migration circuitry of the DESS, migration of data stored in a first tier of storage of the DESS to a second tier of storage of the DESS according to the amount of congestion in the DESS.

2. The method of claim 1, wherein the controlling the migration comprises:
triggering the migration upon concurrent occurrence of:
the amount of congestion in the DESS being less than a determined threshold; and
the data having a first particular characteristic.

3. The method of claim 2, wherein the particular characteristic is one of:
amount of time since creation of the data being greater than a determined threshold;
amount of time since last modification of the data being greater than a determined threshold;
amount of time since last access of the data being greater than a determined threshold;
the data being of a particular size;
the data being of a particular type;
the data having been generated by a particular client process; and
the data having been generated by a particular node of the DESS.

4. The method of claim 1, wherein the determining the amount of congestion in the DESS comprises:
determining a load on a local resource of the DESS; and
determining a load on a remote resource of the DESS based on an indication of the load on the remote resource of the DESS received via a network link.

5. The method of claim 1, wherein the controlling the migration is based on an amount of unused space in the first tier of storage.

6. The method of claim 5, wherein the controlling the migration comprises:
when the amount of unused space in the first tier of storage is below a first threshold, triggering the migration regardless of the amount of congestion of the DESS; and
when the amount of unused space in the first tier of storage is above the first threshold, delaying the migration until the amount of congestion in the DESS is below the first threshold.

7. The method of claim 1, comprising determining, by data migration circuitry of the DESS, whether to store data read from the second tier of storage in the first tier of storage based on the amount of congestion in the DESS.

8. The method of claim 7, comprising storing the data read from the second tier of storage to the first tier of storage only when the amount congestion in the DESS is below a determined threshold.

9. A system comprising:
congestion management circuitry of a distributed electronic storage system (DESS), the congestion management circuitry being operable to determine an amount of congestion in the DESS;
data migration circuitry of the DESS, the data migration circuitry being operable to control migration of data stored in a first tier of storage of the DESS to a second tier of storage of the DESS according to the amount of congestion in the DESS.

10. The system of claim 9, wherein, as part of the control of the migration, the data migration circuitry is operable to:
trigger the migration upon concurrent occurrence of:
the amount of congestion in the DESS being less than a determined threshold; and
the data having a first particular characteristic.

11. The system of claim 10, wherein the particular characteristic is one of:
amount of time since creation of the data being greater than a determined threshold;
amount of time since last modification of the data being greater than a determined threshold;
amount of time since last access of the data being greater than a determined threshold;
the data being of a particular size;
the data being of a particular type;
the data having been generated by a particular client process; and
the data having been generated by a particular node of the DESS.

12. The system of claim 9, wherein, as part of the determination of the amount of congestion in the DESS comprises, the congestion management circuitry is operable to:
determine a load on a local resource of the DESS; and
determine a load on a remote resource of the DESS based on an indication of the load on the remote resource of the DESS received via a network link.

13. The system of claim 9, wherein the control of the migration is based on an amount of unused space in the first tier of storage.

14. The system of claim 13, wherein, as part of the control of the migration, the data migration circuitry is operable to:
when the amount of unused space in the first tier of storage is below a first threshold, trigger the migration regardless of the amount of congestion of the DESS; and
when the amount of unused space in the first tier of storage is above the first threshold, delay the migration until the amount of congestion in the DESS is below the first threshold.

15. The system of claim 9, wherein the data migration circuitry is operable to determine whether to store data read from the second tier of storage in the first tier of storage based on the amount of congestion in the DESS.

16. The system of claim 15, wherein the data migration circuitry is configured to store the data read from the second tier of storage to the first tier of storage only when the amount congestion in the DESS is below a determined threshold.

17. One or more non-transitory machine-readable storage medium having code stored thereon, that, when executed by one or more computing devices of a distributed electronic storage system (DESS), configures the one or more computing devices to comprise DESS congestion management circuitry and DESS data migration circuitry, wherein:
the DESS congestion management circuitry is operable to determine an amount of congestion in the DESS;
the DESS data migration circuitry is operable to control migration of data stored in a first tier of storage of the DESS to a second tier of storage of the DESS according to the amount of congestion in the DESS.

18. The one or more non-transitory machine-readable storage medium of claim 17, wherein, as part of the control of the migration, the data migration circuitry is operable to:
trigger the migration upon concurrent occurrence of:
the amount of congestion in the DESS being less than a determined threshold; and
the data having a first particular characteristic.

19. The one or more non-transitory machine-readable storage medium of claim 18, wherein the particular characteristic is one of:
amount of time since creation of the data being greater than a determined threshold;
amount of time since last modification of the data being greater than a determined threshold;

amount of time since last access of the data being greater than a determined threshold;

the data being of a particular size;

the data being of a particular type;

the data having been generated by a particular client process; and the data having been generated by a particular node of the DESS.

20. The one or more non-transitory machine-readable storage medium of claim 17, wherein, as part of the determination of the amount of congestion in the DESS comprises, the congestion management circuitry is operable to:

determine a load on a local resource of the DESS; and determine a load on a remote resource of the DESS based on an indication of the load on the remote resource of the DESS received via a network link.

21. The one or more non-transitory machine-readable storage medium of claim 17, wherein the control of the migration is based on an amount of unused space in the first tier of storage.

22. The one or more non-transitory machine-readable storage medium of claim 21, wherein, as part of the control of the migration, the data migration circuitry is operable to:

when the amount of unused space in the first tier of storage is below a first threshold, trigger the migration regardless of the amount of congestion of the DESS; and when the amount of unused space in the first tier of storage is above the first threshold, delay the migration until the amount of congestion in the DESS is below the first threshold.

23. The one or more non-transitory machine-readable storage medium of claim 17, wherein the data migration circuitry is operable to determine whether to store data read from the second tier of storage in the first tier of storage based on the amount of congestion in the DESS.

24. The one or more non-transitory machine-readable storage medium of claim 23, wherein the data migration circuitry is configured to store the data read from the second tier of storage to the first tier of storage only when the amount congestion in the DESS is below a determined threshold.

* * * * *